Oct. 22, 1963

C. B. GRANT 3,108,055

PELLETIZING MILL

Filed Sept. 30, 1959

−CATHODE
+ANODE

INVENTOR.
CAMERON B. GRANT
BY
McGrew & Edwards
ATTORNEYS

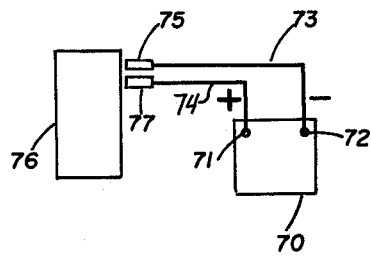
FIG.3.
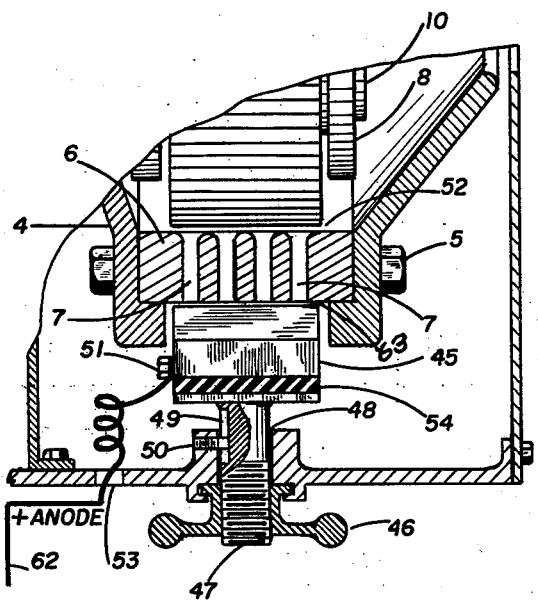
FIG.2.
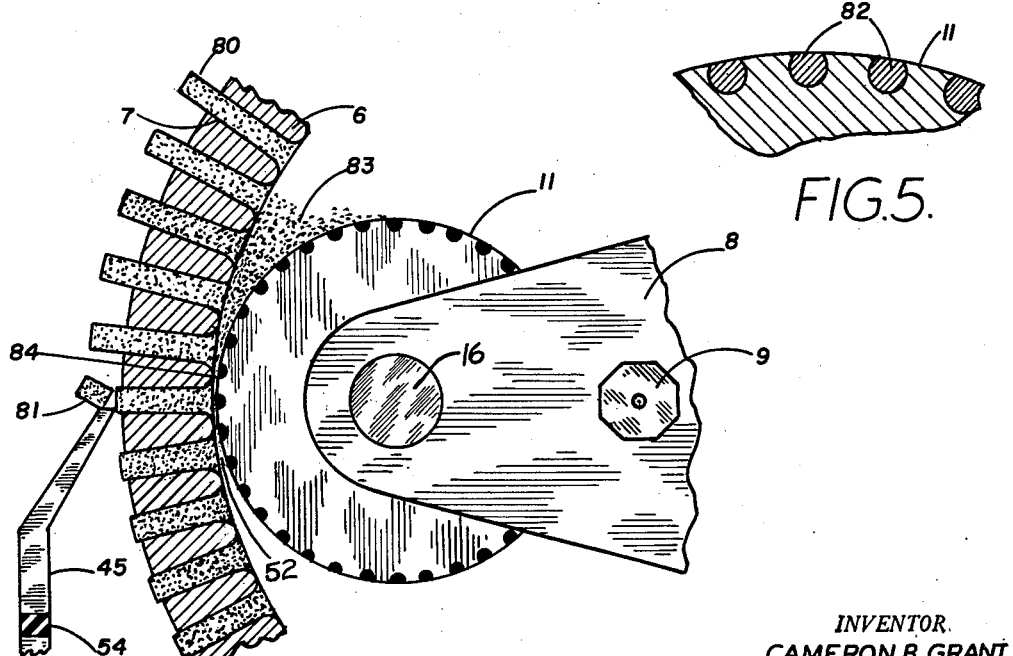
FIG.5.
FIG.4.
INVENTOR.
CAMERON B. GRANT
ATTORNEYS

United States Patent Office 3,108,055
Patented Oct. 22, 1963

3,108,055
PELLETIZING MILL
Cameron B. Grant, 2985 North Ave.,
Grand Junction, Colo.
Filed Sept. 30, 1959, Ser. No. 843,521
4 Claims. (Cl. 204—196)

This invention is directed to a new and improved method and apparatus for forming pellets from such material as livestock feed and similar grain materials for manufacturing into livestock feed and similar pet foods.

Heretofore, the pellet mills used to form pellets from material such as livestock feed have required frequent and expensive repair. The frequent repair has been necessitated because of the previously unexplainable pitting and roughening of the interior hole surface of the pellet dies employed in pellet mills.

Most pellet mills use a ring-type pellet die which is usually made of a hardened steel alloy with a large number of radially machined holes drilled from the exterior surface thereof inwardly.

These pellet dies are very expensive to manufacture and the need of frequent replacement has made livestock feed pelletizing an expensive operation.

The cause of the previously unexplainable pitting and roughening of the interior pellet die surface has been discovered and I have invented a method and apparatus for overcoming it.

It has been discovered that the pitting and roughening of the interior die surface is caused by corrosion due to a galvanic action occuring on the interior surface of the die brought about by the close proximity of the material being treated to the interior die surface, as well as naturally induced chemical actions. The pellet die, or portions of its surface, assumes the role of an anode with the resultant occurrence that metal therefrom is dissolved or electrolytically removed by galvanic action. Further, it has been discovered that by inducing or causing the flow of electrical current to oppose that normally occurring in the pellet die, and by either supplying an expendable metal in the mill, or directly causing common flow in a manner hereinafter described, that the useful life of the pellet die is greatly increased to a degree that pellet die replacement is substantially obviated.

When pelletizing feed materials, such as for the chicken raising industry when it is sometimes advisable and desirable to add fats, such as animal and vegetable fats, to the materials being pelletized, this results in increasing the pitting and roughness of the pellet die by the action of acids present in the fats. Further, these operations are normally associated with steam conditioning.

Therefore, one of the objects of this invention is to provide means to greatly increase the useful life of pellet dies.

A further object of this invention is to provide a method and means to overcome the previously unexplainable pitting and roughening of pellet mill dies.

It is another object of this invention to greatly reduce the cost of pelletizing materials such as livestock feed.

It is a still further object of this invention to provide an improved pellet die for use in pelletizing livestock feed.

It is still a further object to increase and maintain hourly production of the mill by preventing progressive deterioration.

Further objects and improvements will become readily apparent from the reading of the following description with reference to the drawings appended hereto.

Referring to the drawings in which are shown one mode of using my invention:

FIG. 2 is an enlarged section of FIG. 1 according to another mode of practicing this invention;

FIG. 3 is a schematic wire diagram illustrative of the instant invention;

FIG. 4 is a sectional view of a mill roll and a portion of a pellet die; and

FIG. 5 is an enlarged section of the roll according to FIG. 4.

Figure 1:
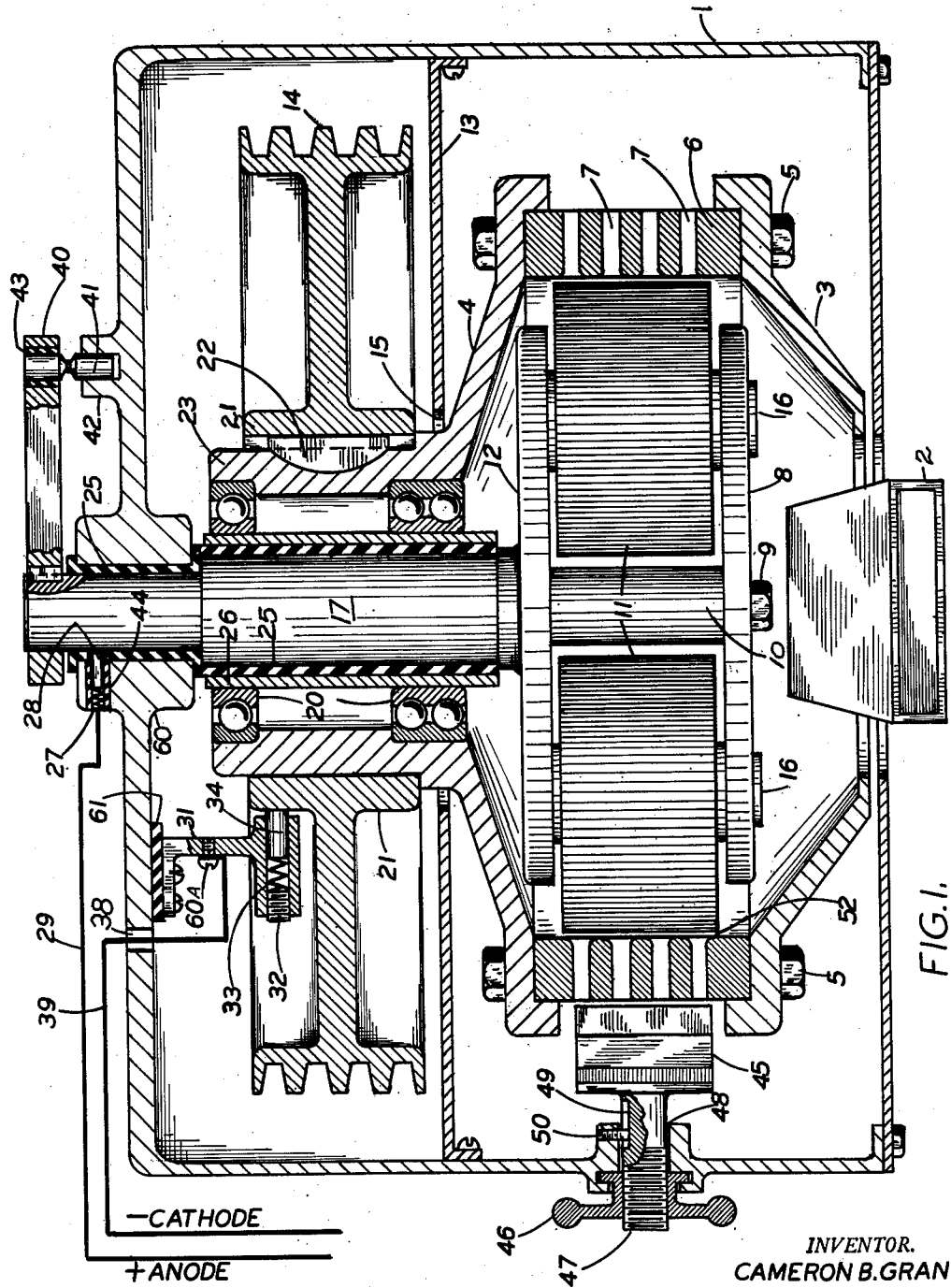
FIG. 1 is a sectional side elevation of a mill incorporating my invention.

More specifically referring to FIG. 1, there is shown outer housing 1 having feed chute 2 opening therein for gravity feed of material to be pelletized. At the interior exit of chute 2 are rolls 11 on axis members indicated by reference character 16 between suitable supports 8 and 12. The supports 8 and 12 are attached to the support 17 by a suitable bolt 9 and a hub 10 which separates the plates 8 and 12. The rolls 11 are in close but not touching contact with the interior surface of the pellet die 6 having therein die holes 7. (Reference character 52 indicates this space.) The die 6 is held in a two-piece supporting structure generally indicated by reference characters 3 and 4 by bolts 5. The portion of the die support generally indicated by reference character 4 has suitably keyed thereto, by keying part 22, the hub 21 of driving wheel 14. The key member 22 of hub 21 fits and keys in a depression in the portion 23 of support structure 4.

Mounted annularly around the roll support 17 is suitable insulating material 25, which may be nylon. Mounted around the nylon insulation 25 is an annular steel member 26, the roll support 17 being journalled inside the hub 23, insulation 25 and steel member 26 by suitable bearing such as bearings 20.

In operation, livestock feed or similar material is fed through chute 2 into the interior of the mill formed by the housing sections 4, 3 and the pellet die 6. Rotation is then furnished the mill structure by a suitable power source (not shown) through belts (not shown) attached to the driving wheel 14, thus turning the pelleting structure housing around the mill support 17 and the rolls 11. Positioned on the exterior of the pellet die 6, in spaced but close proximity to the holes 7, is a suitable knife or cutting element 45. In operation, as the pelletizing proceeds the livestock material will be extruded through the holes 7. As the material is extruded the knife will cut or break off the extruded material to form the desired pellets which will then drop to a suitable container (not shown). The knife 45 is adjustable relative to the surface of pellet die 6 by suitable adjusting means such as hand wheel 46 mounted on a threaded shaft 47 for passage through opening 48 in the outer housing 1. In actual operation, it is desirable to have a means to key the shaft 47 such as the key member 50 which will be in operative association with the keying slot 49. Thus, by suitable turning of the hand wheel 46, the knife blade 45 is caused to move to and from the pellet die 6.

The interior wall 13 suitably divides the outer housing 1 between the driving means and the area in which the pelletizing operation is accomplished. Referring to the drive mechanism, near the outer end of the roll support 17 there is member 40 which has an opening therein containing insulating material 43 for holding a shear pin 41 in position. The other end of the sheer pin is suitably contained in a supporting structure 42 mounted on the exterior surface of the outer housing 1.

Referring now to one method of accomplishing this invention, a wire or conduit 29 suitably connects the positive terminal of a power source (not shown) and the spring biased brush member 28. The spring biased brush member 28 is held in position by spring 27 inside the annularly insulated opening in that portion of the outer housing 1 generally referred to by reference character 60.

The negative terminal of the power source (not shown) is connected by wire or conduit 39 through opening 38 via terminal 60A to the element 31 which suitably contains another spring biased brush element 34. The spring biased brush element 34 may be adjusted by threaded lug 32 compressing spring 33 to adjust the relationship of the brush to hub 21 of the drive wheel 14. Further, the element 31 is suitably insulated from the exterior housing 1 by suitable insulation 61.

Summarizing the operation of the apparatus as depicted in FIG. 1, livestock material which is to be pelletized is fed through the chute 2 into the interior of the pelletizing mill. Concurrently with the feeding through chute 2, the housing of the pelletizing mill which contains the pellet die is caused to rotate around mill rolls which are spaced from the interior die surface and held on a suitable roll support. As the housing and the pellet die rotate, feed material is extruded through openings where it is suitably disengaged from the die surface thereby forming the small pieces which are the desired pellets. Further, the size of the pellets may be varied according to the positioning of the knife relative to the pellet die surface, i.e., the length of the pellets may be varied. During the pelletizing operation, a cathodic condition is induced on the pellet die 6 while an anodic condition is induced on rolls 11.

Referring now to FIG. 2 which is a partial section of a portion of FIG. 1 and is indicative of another mode of practicing my invention; instead of connecting the positive terminal through the brush element 28 to the mill support 17, it may be desirable in some situations to connect the positive terminal directly to the knife 45. In such an application, the knife element 45 will have suitable insulating material 54 disposed between the threaded shaft 47 and the cutting surface of the knife. The positive terminal is connected to the knife element 45 by suitable conduit 62 passing through the opening 53 in the outer housing for connection to the blade by bolt 51. Thus, current will be caused to flow across the space 63 between the exterior pellet die surface and the knife elements 45. Of course, in this modification, the negative terminal of the power source will be connected as illustrated in FIG. 1, through the element 31 and spring biased brush element 34 for eventual connection to the pellet die, while the positive terminal will be connected to the knife 45 instead of through brush 28.

FIG. 3 is a schematic illustration of a circuit diagram according to the instant invention. The element 70 is a suitable power source which has a negative terminal 72 and a positive terminal 71. The positive terminal 71 is connected by conduit 74 to element 77. The element 77 may be, according to the various modifications shown herein, the knife blade, or rolls 11, or the modification wherein expendable metal is inlaid in the rolls 11 (which is described hereafter). The conduit 73 is suitably connected to the element 75, which is the spring biased brush member 34, for cooperative association with the pellet die which is indicated by reference character 76 in FIG. 3.

Referring now to FIG. 4, there is shown a sectional view of one mill roll and a portion of the pellet die. The mill roll 11 is shown as supported on the plate 8 by the bolt 9, and the axle 16. The depressions or grooves of the roll 11 are shown to contain an expendable metal element 82. The expendable metal element 82 is chosen in the electromotive series from those having more active characteristics than the steel alloy material of which the pellet die 6 is made. Thus, any electrodisposition or chemical removal of metal, will be from other than pellet die 6, most probably from the metal 82 disposed in the grooves of roll 11.

Further referring to FIG. 4, the material or livestock feed 83, which has been previously fed through chute 2 is extruded by action of the roll 11 through the holes 7 in the pellet die 6 generally shown by reference numeral 80. Also, the knife element 45 is spaced a small distance from the surface of the pellet die 6 for breaking or cutting portions of the extruded feed material, generally designated by reference character 81. In this mode of practicing my invention, i.e., wherein an expendable material 82 is disposed in the grooves of roll 11, the configuration or anode connection shown in FIG. 2, wherein the blade element 45 has insulation 54 between the cutting surface and the adjusting mechanism, is the electrical connection used. Also, it is obvious that the cathode connection remains the same although it is not shown specifically.

If a higher electrical potential is desired in the mill, as well as having the expendable material 82, in the grooves of element 11, an anodic connection such as through brush element 28, could additionally be used. Thus, there would be current flowing through knife element 45 as well as the brush 28 and roll support 17 to the expendable material 82 which is in close association, but not touching the interior surface of the pellet die 6.

Referring to the choice of expendable metals, the preferred metals inlaid on rolls 11 are magnesium and zinc, although others which will have the same activity characteristics with reference to the alloy used in the pellet die 6, may be used.

In operation, the pellet die is suitably connected to the negative source of electrical current while the other pole is suitably connected to some adjacent portion of the mill, such as the roll support. From the foregoing, it is obvious that there is induced a flow of current across a space from the source of power to the pellet die such as across space 52. Thus, any electrodisposition or chemical action that will occur in the mill which would cause pitting or roughening of surfaces will act upon other portions of the mill than the die, such as expendable material placed in the mill.

It is important that the expendable material, if expendable material is used, be selected with care to avoid including metals which might have a toxic effect on livestock.

There are other ways in which my invention may be practiced, such as suitably inlaying expendable metal in the grooves of the rolls, such as shown by reference character 82 of FIG. 5 (or some other surface in cooperative relationship with the pellet die). Also, merely placing the metal in roll recesses is contemplated.

One manner in which an inlay of the expendable metal may be accomplished is to deepen the grooves normally present on the rolls and to thereafter deposit the metal in said grooves. By suitably insulating the rolls in the supporting structure, it will then be possible to run the negative terminal to the die, while the positive terminal is attached through suitable means to the rolls, thus accomplishing desired current flow.

In some pellet mills, the knife blades are in very close relation to the pellet die surface. In such instances, since the necessary spacing between anodic and cathodic mill portions is lacking, it is anticipated another suitably insulated and anodically charged member may be incorporated outside the mill which will be spaced from the cathodic die surface to thus use the instant inventive concept.

It is, of course, to be understood that there are many other physical manners in which the inventive concept of my invention may be practiced, and it is to be understood that I do not desire to be limited to any particular apparatus herein shown, but rather by the scope of the claims appended hereto.

I claim:

1. A pellet mill having an outer housing, a shaft mounted in said housing rotatably supporting an internal housing, a pelletizing die mounted in and forming a substantial portion of the periphery of the internal housing, said die being composed of an electrically conductive material, roll means supported by said shaft internally of said internal housing and maintained spaced from and adjacent to said die, the outer peripheral surface of said roll means having a plurality of grooves, said grooves filled with an expendable electrically conductive material more active than the electrically conductive material from which the die is composed, breaking means supported by said outer housing and maintained adjacent but spaced from said die, said die being electrically insulated from the shaft, the roll means, and the breaking means, and a source of electric current the negative terminal of which is in electrically conductive association with the die and the positive terminal of which is in electrically conductive association with a part of the mill adjacent but spaced from said die and in electrically conductive association with said expendable material whereby the expendable material is preferentially corroded when the mill is in operation.

2. A pellet mill having an outer housing, a shaft mounted in said housing rotatably supporting an internal housing, a pelletizing die mounted in and forming a substantial portion of the outside periphery of the internal housing, roll means supported by said shaft internally of said internal housing maintained spaced from and adjacent to said die, at least a portion of the outer peripheral surface of said roll means carrying an expendable electrically conductive material more active than the conductive material from which the die is composed, breaking means supported by said outer housing maintained adjacent but spaced from said die, said die being electrically insulated from the shaft, the roll means, and the breaking means, and a source of electric current the negative terminal of which is in electrically conductive association with the die and the positive terminal of which is in electrically conductive association with a part of the mill adjacent but spaced from said die and in electrically conductive association with said expendable material whereby the expendable material is preferentially corroded when the mill is in operation.

3. A pellet mill having an outer housing a shaft mounted in said housing rotatably supporting an internal housing, a pelletizing die composed of an electrically conductive material mounted in and forming a substantial portion of the periphery of the internal housing, roll means supported by said shaft internally of said internal housing and maintained spaced from and adjacent to said die, the outer peripheral surface of said roll means having a plurality of elongated substantially transverse grooves, said elongated grooves filled with an expendable electrically conductive material more active than the electrically conductive material from which the die is composed, breaking means supported by said outer housing and maintained adjacent but spaced from said die, said die being electrically insulated from the shaft, the roll means, and the breaking means, and a source of electric current the negative terminal of which is in electrically conductive association with the die and the positive terminal of which is in electrically conductive association with the roll means whereby the expendable material is preferentially corroded when the mill is in operation.

4. The mill of claim 1 in which there is also electrically conductive association between the positive terminal of the source of electric current and the breaking means.

References Cited in the file of this patent

UNITED STATES PATENTS

| | | |
|---|---|---|
| 638,804 | Fowler | Dec. 12, 1899 |
| 2,154,949 | Lyons | Apr. 18, 1939 |
| 2,240,660 | Meakin | May 6, 1941 |
| 2,252,900 | Shafer | Aug. 19, 1941 |
| 2,279,632 | Meakin | Apr. 14, 1942 |
| 2,283,169 | Atwood | May 19, 1942 |
| 2,433,156 | Pezzillo | Dec. 23, 1947 |
| 2,666,026 | Gibbs | Jan. 12, 1954 |
| 2,803,602 | De Cowsky et al. | Aug. 20, 1957 |

FOREIGN PATENTS

| | | |
|---|---|---|
| 503,946 | Great Britain | July 9, 1937 |